United States Patent
Hachiya et al.

(10) Patent No.: US 10,411,633 B2
(45) Date of Patent: Sep. 10, 2019

(54) CONTROL DEVICE FOR AC ROTATING MACHINE

(71) Applicant: Mitsubishi Electric Corporation, Chiyoda-ku (JP)

(72) Inventors: Yosuke Hachiya, Chiyoda-ku (JP); Masato Ito, Chiyoda-ku (JP); Hisanori Yamasaki, Chiyoda-ku (JP); Akira Satake, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/316,920

(22) PCT Filed: Mar. 27, 2015

(86) PCT No.: PCT/JP2015/059666
§ 371 (c)(1),
(2) Date: Dec. 7, 2016

(87) PCT Pub. No.: WO2016/157306
PCT Pub. Date: Oct. 6, 2016

(65) Prior Publication Data
US 2017/0104431 A1    Apr. 13, 2017

(51) Int. Cl.
*H02P 21/14* (2016.01)
*H02P 29/40* (2016.01)
(Continued)

(52) U.S. Cl.
CPC ............ *H02P 21/143* (2013.01); *H02P 21/18* (2016.02); *H02P 21/20* (2016.02); *H02P 27/06* (2013.01); *H02P 29/40* (2016.02)

(58) Field of Classification Search
CPC ......... H02P 21/143; H02P 27/06; H02P 29/40
See application file for complete search history.

(56) References Cited

U.S. PATENT DOCUMENTS 4,649,328 A * 3/1987 Leonard .................. H02P 29/40
                                                318/271
5,532,571 A * 7/1996 Masaki .................... H02P 21/00
                                                318/799

(Continued)

FOREIGN PATENT DOCUMENTS

JP    7-298698 A     11/1995
JP    07298698 A  *  11/1995
(Continued)

OTHER PUBLICATIONS

Korean Office Action dated Nov. 22, 2017 in Patent Application No. 10-2016-7035749 (with English translation).
(Continued)

*Primary Examiner* — Muhammad S Islam
(74) *Attorney, Agent, or Firm* — Oblon, McClelland, Maier & Neustadt, L.L.P.

(57) ABSTRACT

A control device for an AC rotating machine includes: a current detection unit; a command generation unit for generating a voltage command, using a moment of inertia J; a speed estimation unit for calculating an estimated speed ω0 on the basis of the voltage command and detected current; an output torque computing unit for calculating output torque on the basis of the detected current; and an inertia moment computing unit for calculating the moment of inertia J. The output torque computing unit gives a delay characteristic corresponding to an estimation delay of the estimated speed ω0, to the output torque, and the inertia moment computing unit calculates the moment of inertia J on the basis of the estimated speed ω0 and the output torque having the delay characteristic.

20 Claims, 8 Drawing Sheets

(51) Int. Cl.
*H02P 27/06* (2006.01)
*H02P 21/18* (2016.01)
*H02P 21/20* (2016.01)

(56) References Cited

U.S. PATENT DOCUMENTS

| | | | | |
|---|---|---|---|---|
| 2009/0173006 A1* | 7/2009 | Jitsuishi | ............... | E05F 15/40 49/31 |
| 2013/0221885 A1* | 8/2013 | Hunter | ............... | H02P 21/0003 318/400.15 |
| 2014/0028224 A1* | 1/2014 | Arima | ............... | H02P 21/24 318/400.02 |

FOREIGN PATENT DOCUMENTS

| | | | |
|---|---|---|---|
| JP | 2004-242430 | A | 8/2004 |
| JP | 3683121 | B2 | 8/2005 |
| JP | 2014-27742 | A | 2/2014 |

OTHER PUBLICATIONS

International Search Report dated Jun. 16, 2015 in PCT/JP2015/059666 filed Mar. 27, 2015.

Hori, Yoichi et al., "High-performance Control of a Servomotor using a Low Precision Shaft Encoder-Instantaneous Speed Observer and Identification of the Inertia Moment-," T.IEE Japan, 1994, vol. 114-D, No. 4, (with English Abstract), pp. 424-431, (8 pages).

Kinpara, Yoshihiko, "Position Sensorless Control of PM Motor Using Adaptive Observer on Rotational Coordinate," IEEJ Trans. IA, 2003, vol. 123, No. 5, (with English Abstract), pp. 600-609, (10 pages).

Chen, Zhiqian et al., "Position and Velocity Sensorless Controls of Cylindrical Brushless DC Motors Using Disturbance Observers and Adaptive Velocity Estimatiors," T.IEE Japan, 1998, vol. 118-D, No. 7/8, (with English Abstract), pp. 828-835, (8 pages).

Office Action dated Nov. 1, 2018 in Chinese Application No. 201580057563.7 (Computer-generated English translation).

* cited by examiner

CONTROL DEVICE FOR AC ROTATING MACHINE

TECHNICAL FIELD

The present invention relates to a control device for driving an AC rotating machine connected to a mechanical device.

BACKGROUND ART

In the case of controlling an AC rotating machine to drive a mechanical device, in order to drive the AC rotating machine connected to the mechanical device with a desired response, it is necessary to identify a machine constant of the mechanical device to which the AC rotating machine is connected. However, the actual mechanical device has a complicated mechanism, and it is often difficult to grasp the precise machine constant. In order to solve such a problem, there is a conventional method of estimating the moment of inertia which is the machine constant of the mechanical device.

For example, in the method described in Non-Patent Document 1, current of the AC rotating machine is detected to calculate torque, and the rotation speed of the AC rotating machine is detected using a speed sensor and a position sensor. An acceleration component is calculated from the rotation speed, and on the basis of the equation of motion for the AC rotating machine, the moment of inertia is calculated using a statistical method. In this case, since the speed sensor and the position sensor are used, there is a disadvantage in failure resistance and maintenance.

Therefore, in order to estimate the moment of inertia of the mechanical device without using these sensors, a vector control inverter device is proposed as a conventional control device for AC rotating machine.

The vector control inverter device gives a certain torque axis (q-axis) current command to the AC rotating machine which is rotated at a constant speed by angular speed control, thereby causing minute change. Then, the torque change amount is calculated from the detected current, and an acceleration component is extracted from estimated speeds of the AC rotating machine before and after the torque axis current command is changed, thereby calculating the moment of inertia (see, for example, Patent Document 1).

Non-Patent Document 2 discloses a design method for a speed estimation gain and a feedback gain for an adaptive observer which is configured on rotational two axes in position sensorless control for an electric motor.

CITATION LIST

Patent Document

Patent Document 1: Japanese Laid-Open Patent Publication No. 2004-242430

Non-Patent Document

Non-Patent Document 1: "High-performance Control of a Servomotor using a Low Precision Shaft Encoder, Instantaneous Speed Observer and Identification of the Inertia Moment", IEEJ transactions D, vol. 114, no. 4, 1994
Non-Patent Document 2: "Position Sensorless Control of PM Motor Using Adaptive Observer on Rotational Coordinate", IEEJ transactions D, vol. 123, no. 5, 2003

SUMMARY OF THE INVENTION

Problems to be Solved by the Invention

In the conventional control device for AC rotating machine which does not use a speed sensor nor a position sensor as shown in Patent Document 1 and Non-Patent Document 2, the speed of the AC rotating machine is estimated using a controller such as PI control. Therefore, a delay occurs until an estimated speed which is output of the controller converges, that is, an estimation delay occurs on the estimated speed relative to the actual rotating machine speed. Thus, there is a problem that error occurs in the calculated moment of inertia.

The present invention has been made to solve the above problem, and an object of the present invention is to provide a control device for AC rotating machine, that is capable of accurately calculating the moment of inertia without using a speed sensor and a position sensor.

Solution to the Problems

A control device for AC rotating machine according to the present invention includes: a command generation unit for, using a moment of inertia, generating a voltage command for driving an AC rotating machine connected to a mechanical device; a current detection unit for detecting current of the AC rotating machine; an output torque computing unit for calculating output torque of the AC rotating machine on the basis of the detected current from the current detection unit; a speed estimation unit for calculating an estimated speed of the AC rotating machine on the basis of the voltage command and the detected current; and an inertia moment computing unit for calculating the moment of inertia on the basis of the estimated speed and the output torque. The output torque computing unit gives a delay characteristic corresponding to an estimation delay of the estimated speed, to the output torque. The inertia moment computing unit calculates the moment of inertia, using the output torque having the delay characteristic.

Effect of the Invention

In the control device for AC rotating machine according to the present invention, the inertia moment computing unit calculates the moment of inertia, using the estimated speed and the output torque having the delay characteristic corresponding to the estimation delay of the estimated speed, whereby the moment of inertia can be accurately calculated. Thus, the control device for AC rotating machine can reliably control the AC rotating machine, with a desired response.

DESCRIPTION OF EMBODIMENTS

Embodiment 1

Figure 1:
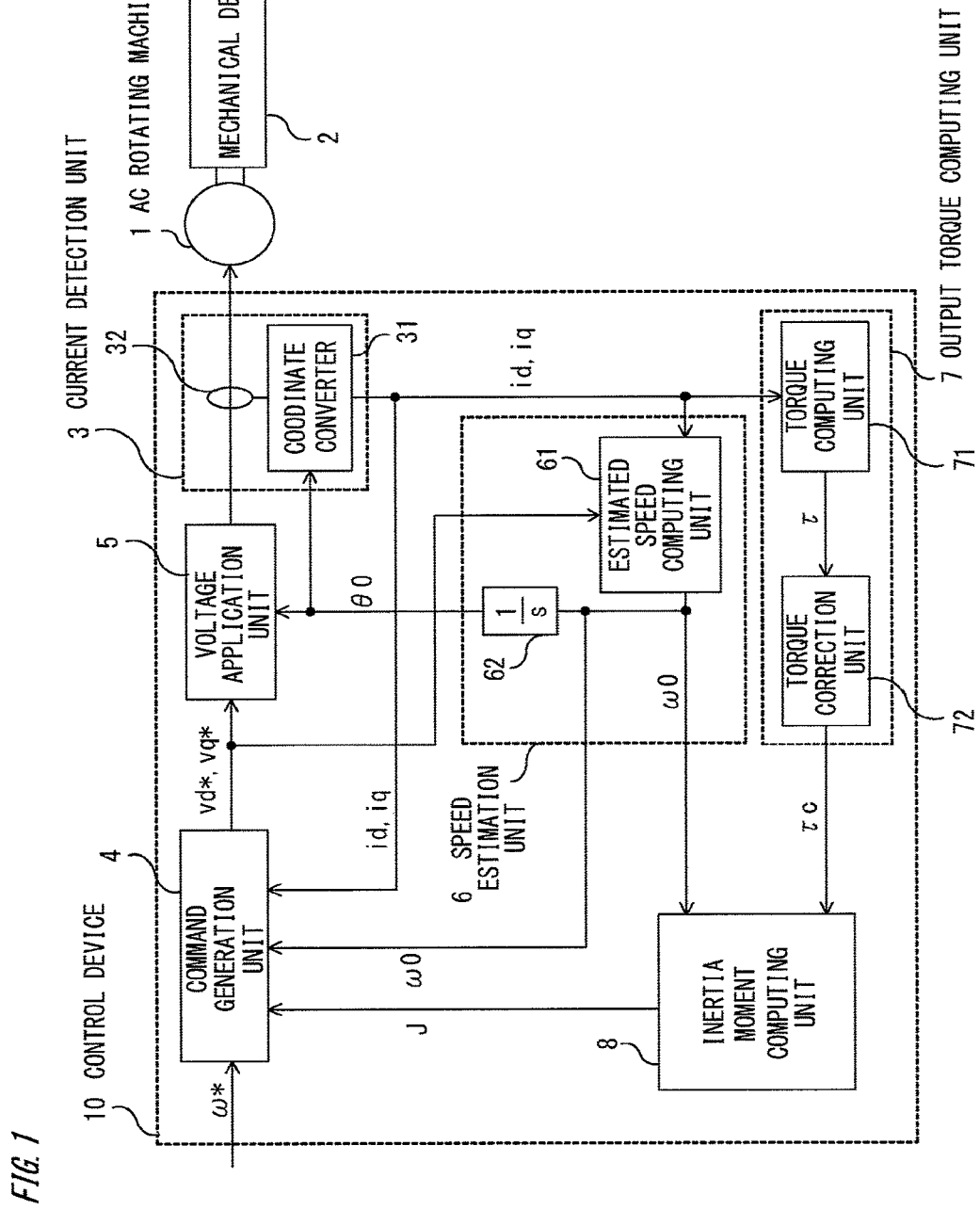
FIG. 1 is a block diagram showing the configuration of a control device for AC rotating machine according to embodiment 1 of the present invention.

Hereinafter, a control device for AC rotating machine according to embodiment 1 of the present invention will be described. FIG. 1 is a block diagram showing the configuration of the control device for AC rotating machine according to embodiment 1 of the present invention.

As shown in FIG. 1, a mechanical device 2 is connected to an AC rotating machine 1, and a control device 10 for the AC rotating machine 1 drive-controls the AC rotating machine 1, whereby the AC rotating machine 1 drives the mechanical device 2. As the AC rotating machine 1, for example, a synchronous machine using a permanent magnet is used.

The control device 10 includes: a current detection unit 3 for detecting current of the AC rotating machine 1; a command generation unit 4 for generating voltage commands vd* and vq* for driving the AC rotating machine 1; a voltage application unit 5 for applying voltage to the AC rotating machine 1; a speed estimation unit 6 for calculating an estimated speed ω0 and an estimated magnetic pole position θ0; an output torque computing unit 7; and an inertia moment computing unit 8. The voltage application unit 5 is configured from a power converter such as an inverter circuit. In this case, the control device 10 is provided with the voltage application unit 5, and output of the voltage application unit 5 is outputted from the control device 10 to the AC rotating machine 1.

The current detection unit 3 includes a coordinate converter 31 for converting three-phase currents iu, iv, iw of the AC rotating machine 1 to currents in a rotational two-axis coordinate system. The current detection unit 3 detects the three-phase currents iu, iv, iw, and using the estimated magnetic pole position θ0 outputted from the speed estimation unit 6, the coordinate converter 31 performs coordinate conversion of the three-phase currents iu, iv, iw to obtain currents on d-q axes which are known as an orthogonal coordinates system that rotates in synchronization with a rotor of the AC rotating machine 1. The current detection unit 3 outputs the obtained currents as detected currents id and iq.

In order to detect the three-phase currents, instead of detecting all of the three-phase currents, the currents for two phases may be detected and then the current for the remaining one phase may be calculated using the fact that the sum of the three-phase currents is zero. Alternatively, the three-phase currents may be calculated from, for example, the bus current of the power converter, current flowing through a switching element, and the state of the switching element, in the voltage application unit 5.

Figure 2:
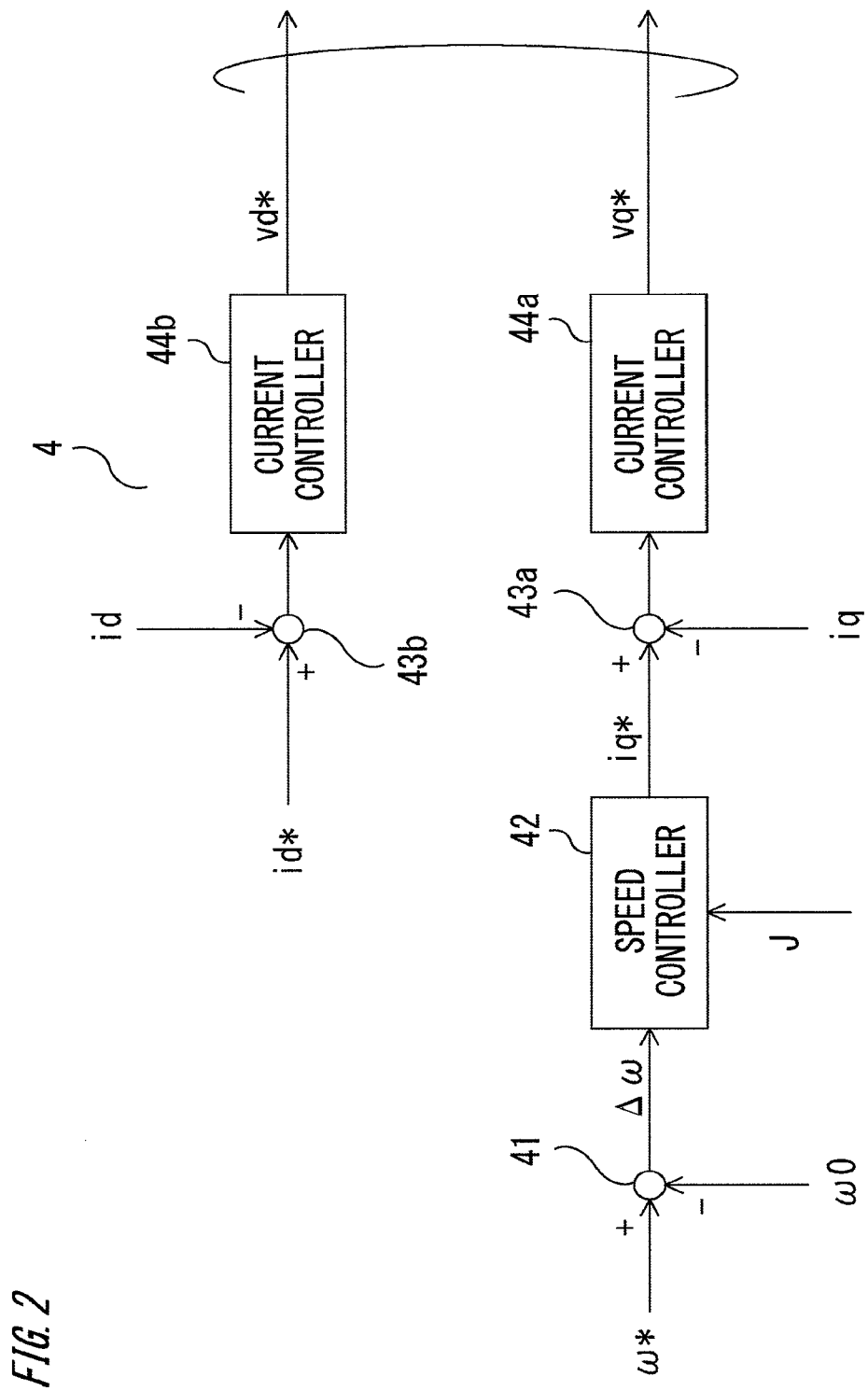
FIG. 2 is a block diagram illustrating a command generation unit in embodiment 1 of the present invention.

An arbitrary speed command ω* for driving the AC rotating machine 1 is given to the control device 10, and then is inputted to the command generation unit 4. On the basis of a speed command ω*, the estimated speed ω0 outputted from the speed estimation unit 6, and a moment of inertia J outputted from the inertia moment computing unit 8, the command generation unit 4 calculates and outputs the voltage commands vd* and vq* on d-q axes, which are needed for driving the AC rotating machine 1. FIG. 2 shows an example of the control configuration of the command generation unit 4.

As shown in FIG. 2, the command generation unit 4 includes a speed controller 42 and current controllers 44a and 44b. An adder-subtractor 41 subtracts the estimated speed ω0 from the speed command ω*, to calculate a speed deviation Δω. The speed controller 42 calculates a current command iq* for the detected current iq on q-axis which is torque current, through PI control using the value of the moment of inertia J so that the speed deviation Δω becomes zero.

In order to perform rotation control for the AC rotating machine 1 with a desired response, in general, the PI controller of the speed controller 42 is set on the basis of expression (1).

$$iq^* = kwp(1 + kwi/s) \cdot \Delta\omega \quad (1)$$

where $kwp = \omega sc \cdot Pm^2 \cdot \phi f / J$, $kwi = \omega sc / N$, s is Laplace operator, ωsc is a speed response set value, Pm is the number of pole pairs of the AC rotating machine, φf is the magnet magnetic flux of the AC rotating machine, J is the moment of inertia, and N is an arbitrary positive integer.

Next, an adder-subtractor 43a subtracts the detected current iq from the current command iq*, to calculate a q-axis current deviation. The current controller 44a calculates the voltage command vq* through PI control so that the q-axis current deviation becomes zero.

On the other hand, a current command id* on d-axis may be merely set to zero, or may be set on the basis of the current command iq* on q-axis so that torque outputted from the AC rotating machine 1 is maximized. An adder-subtractor 43b subtracts the detected current id from the current command id*, to calculate a d-axis current deviation. The current controller 44b calculates the voltage command vd* through PI control so that the d-axis current deviation becomes zero.

As described above, the speed controller 42 generates the current command iq* so that the estimated speed ω0 follows the speed command ω*, and the current controllers 44b and 44a generate the voltage commands vd* and vq* so that the detected currents id and iq follow the current commands id* and iq*. Thus, the AC rotating machine 1 can be controlled so that the estimated speed ω0 coincides with the speed command ω*.

The voltage application unit 5 converts the voltage commands vd* and vq* on d-q axes outputted from the command generation unit 4, to three-phase voltage commands vu*, vv*, vw* in a coordinate system at rest, using the estimated magnetic pole position θ0 outputted from the speed estimation unit 6, and then the voltage application unit 5 outputs three-phase voltages on the basis of the three-phase voltage commands vu*, vv*, vw*, to apply the three-phase voltages to the AC rotating machine 1.

The speed estimation unit 6 includes: an estimated speed computing unit 61 for calculating the estimated speed ω0 of the AC rotating machine 1 on the basis of the detected currents id and iq and the voltage commands vd* and vq*;

and an integrator 62 for integrating the estimated speed $\omega 0$ to calculate the estimated magnetic pole position $\theta 0$ of the AC rotating machine 1.

The estimated speed computing unit 61 calculates the estimated speed $\omega 0$ of the AC rotating machine 1 by a known method on the basis of the detected currents id and iq and the voltage commands vd* and vq*. For example, current values are estimated from a model of the AC rotating machine obtained on the basis of the voltage commands vd* and vq*, and then the estimated speed $\omega 0$ is calculated so that the estimated current values coincide with the detected currents id and iq.

The integrator 62 calculates the estimated magnetic pole position $\theta 0$ by the following expression (2), using the estimated speed $\omega 0$ outputted from the estimated speed computing unit 61.

$$\theta 0 = \omega 0/s \quad (2)$$

The method for calculating the estimated speed $\omega 0$ of the AC rotating machine 1 on the basis of the detected currents id and iq and the voltage commands vd* and vq* is known without limitation to Patent Document 1 or Non-Patent Document 2. The estimated speed $\omega 0$ is calculated using a controller in the estimated speed computing unit 61, and a phase delay occurs until the estimated speed $\omega 0$ converges, that is, the estimated speed $\omega 0$ has an estimation delay.

For example, as shown in Non-Patent Document 2, an open loop transfer characteristic from the actual speed $\omega$ of the AC rotating machine 1 to the calculated estimated speed $\omega 0$ is indicated by a transfer function as follows.

$$G(s) = \omega ac/s$$

where $\omega ac$ is a speed estimation gain.

Thus, a transfer function indicating a closed loop transfer characteristic from the actual speed $\omega$ to the estimated speed $\omega 0$ is represented by the following expression (3).

$$Gx(s) = G(s)/(1 + G(s)) \\ = \omega ac/(s + \omega ac) \quad (3)$$

As shown by the above expression (3), the calculated estimated speed $\omega 0$ includes an estimation delay relative to the actual speed $\omega$.

The output torque computing unit 7 includes: a torque computing unit 71 for calculating output torque $\tau$ from the detected currents id and iq; and a torque correction unit 72 for correcting the output torque $\tau$ to calculate corrected output torque $\tau c$.

The torque computing unit 71 calculates the output torque $\tau$ of the AC rotating machine 1 by the following expression (4) on the basis of the detected currents id and iq.

$$\tau = Pm(\phi f \cdot iq + (Ld - Lq) \cdot id \cdot iq) \quad (4)$$

where Ld and Lq are inductances in the d-axis and q-axis directions of the AC rotating machine.

The torque correction unit 72 causes the output torque $\tau$ calculated by the torque computing unit 71 to pass through a filter, thereby correcting the output torque $\tau$. The filter of the torque correction unit 72 is a filter having the same transfer characteristic as the transfer characteristic from the actual speed $\omega$ to the estimated speed $\omega 0$ shown by the above expression (3), that is, calculates the corrected output torque $\tau c$ by the following expression (5) and outputs the same.

$$\tau c = Gx(s) \cdot \tau \quad (5)$$

Since the torque computing unit 71 calculates, on the basis of the detected currents id and iq, the output torque $\tau$ when the AC rotating machine 1 rotates at the actual speed $\omega$, it can be said that the output torque $\tau$ is synchronized with the actual speed $\omega$. Therefore, by the torque correction unit 72 correcting the output torque $\tau$ using the transfer function Gx(s) from the actual speed $\omega$ to the estimated speed $\omega 0$, the output torque $\tau$ is delayed by an amount corresponding to the estimation delay of the estimated speed $\omega 0$, and thus the corrected output torque $\tau c$ and the estimated speed $\omega 0$ can be synchronized with each other.

As described above, using the transfer characteristic (transfer function Gx(s)) corresponding to the estimation delay of the estimated speed $\omega 0$, the torque correction unit 72 gives a delay characteristic corresponding to the estimation delay, to the output torque $\tau$, and outputs the corrected output torque $\tau c$.

The inertia moment computing unit 8 calculates the moment of inertia J from the estimated speed $\omega 0$ from the speed estimation unit 6 and the corrected output torque $\tau c$ from the output torque computing unit 7.

By the way, according to the equation of motion for the AC rotating machine, the moment of inertia J is calculated using the following expression (6) from the speed (actual speed) $\omega$ and the output torque $\tau$.

$$J = \tau/(s \cdot \omega) \quad (6)$$

In the case of calculating the moment of inertia J using the above expression (6), filters are used respectively for the output torque $\tau$ and the speed $\omega$, to suppress calculation error.

Since the output torque $\tau$ is calculated using the detected currents id and iq by the above expression (4), the output torque $\tau$ contains detection noise in a high-frequency region. In addition, since transitional output torque during acceleration is used, a DC component in a low-frequency region of a stationary load or the like becomes calculation error in the moment of inertia.

In order to remove such a low-frequency component and a high-frequency component and extract a transitional torque change amount, a filter F$\tau$(s) for the output torque $\tau$ is set as shown by the following expression (7).

$$F\tau(s) = s/f(s) \quad (7)$$

where the polynomial f(s) in the denominator is a cubic polynomial of s having such a characteristic that removes a low-frequency component and a high-frequency component.

If a transitional torque component of the output torque $\tau$ is denoted by d$\tau$, the transitional torque component d$\tau$ can be extracted from the output torque $\tau$ by the following expression (8).

$$d\tau = F\tau(s) \cdot \tau \quad (8)$$

Also a filter F$\omega$(s) for the speed $\omega$ needs to have the same characteristic as the filter F$\tau$(s) for the output torque $\tau$. As shown by the above expression (6), the acceleration (s·$\omega$) obtained from the speed $\omega$ is used for calculation of the moment of inertia J. If a transitional acceleration component is denoted by da, the transitional acceleration component da can be extracted from the speed $\omega$ by the following expression (9), and the filter F$\omega$(s) can be represented by the following expression (10).

$$da = F\omega(s) \cdot \omega \quad (9)$$
$$= F\tau(s) \cdot (s \cdot \omega)$$
$$= s \cdot F\tau(s) \cdot \omega$$

$$F\omega(s) = s \cdot F\tau(s) \quad (10)$$

Figure 3:
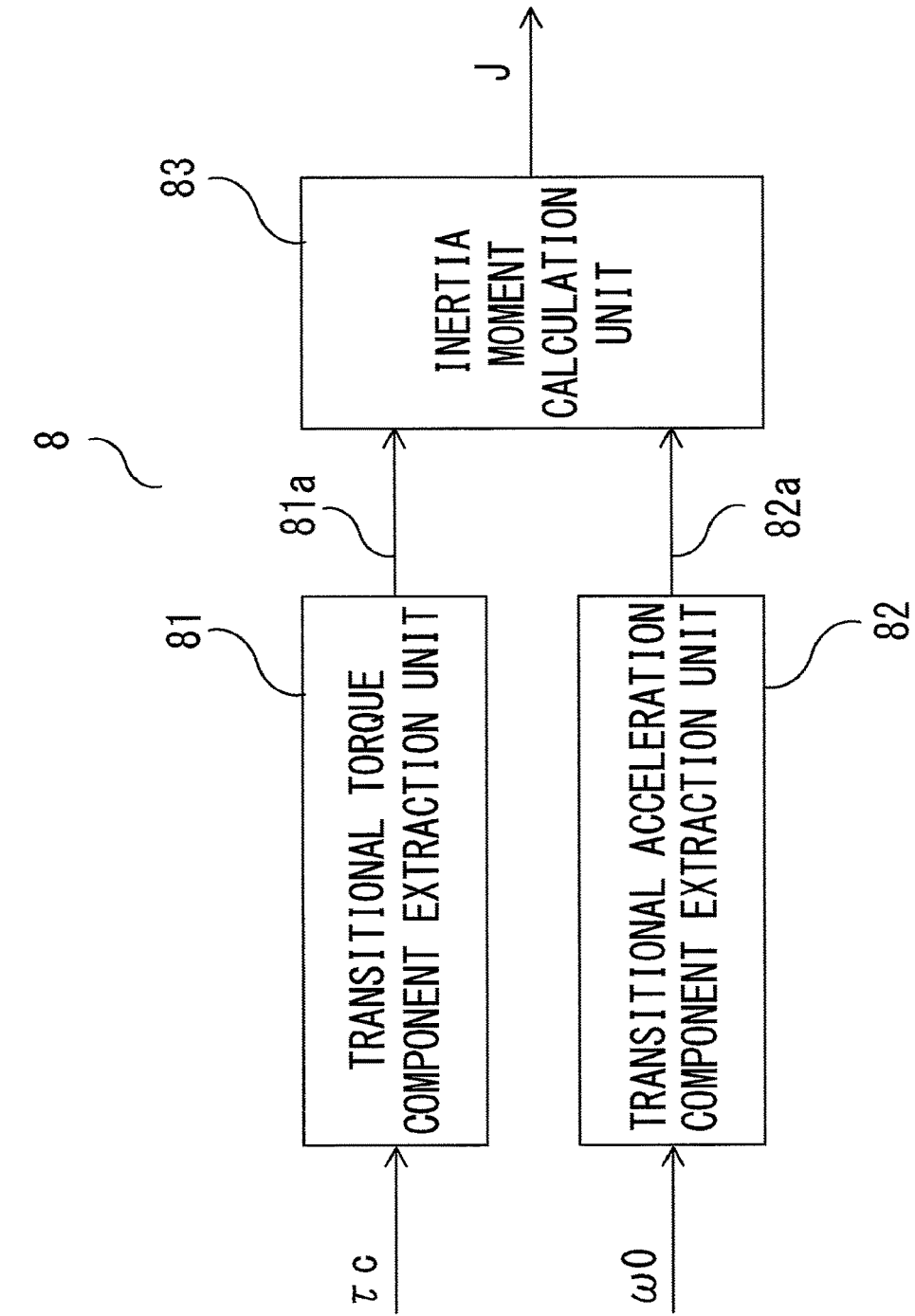
FIG. 3 is a block diagram illustrating an inertia moment computing unit in embodiment 1 of the present invention.

FIG. 3 is a diagram illustrating the configuration of the inertia moment computing unit 8.

As shown in FIG. 3, the inertia moment computing unit 8 includes a transitional torque component extraction unit 81, a transitional acceleration component extraction unit 82, and an inertia moment calculation unit 83. The inertia moment computing unit 8 receives the estimated speed ω0 from the speed estimation unit 6 and the corrected output torque τc from the output torque computing unit 7, and the corrected output torque τc is inputted to the transitional torque component extraction unit 81 and the estimated speed ω0 is inputted to the transitional acceleration component extraction unit 82.

The transitional torque component extraction unit 81 corresponds to the above filter Fτ(s), that is, removes a low-frequency component and a high-frequency component and extracts a transitional torque component 81a from the corrected output torque τc. The transitional acceleration component extraction unit 82 corresponds to the above filter Fω(s), that is, removes a low-frequency component and a high-frequency component and extracts a transitional acceleration component 82a from the estimated speed ω0. Then, the inertia moment calculation unit 83 calculates the moment of inertia J by dividing the transitional torque component 81a by the transitional acceleration component 82a.

In the present embodiment, using the transfer characteristic (Gx(s)) from the actual speed ω to the estimated speed ω0, τc and ω0 can be represented as follows.

$$\tau C = Gx(s) \cdot \tau \quad (11)$$

$$\omega 0 = Gx(s) \cdot w \quad (12)$$

Therefore, from the above expression (11), the transitional torque component 81a is represented as follows.

$$F\tau(s) \cdot \tau c = F\tau(s) \cdot Gx(s) \cdot \tau \quad (13)$$

In addition, from the above expression (10) and expression (12), the transitional acceleration component 82a is represented as follows.

$$F\omega(s) \cdot \omega 0 = s \cdot F\tau(s) \cdot Gx(s) \cdot \omega \quad (14)$$

Thus, from the above expression (13) and expression (14), the moment of inertia J calculated as (transitional torque component 81a)/(transitional acceleration component 82a) is represented as follows.

$$J = F\tau(s) \cdot Gx(s) \cdot \tau / (s \cdot F\tau(s) \cdot Gx(s) \cdot \omega) \quad (15)$$
$$= \tau / s \cdot \omega$$

It is found that this expression coincides with the above expression (6).

Thus, the inertia moment computing unit 8 can accurately calculate the moment of inertia J, using the corrected output torque τc and the estimated speed ω0.

If the output torque τ is directly used without performing correction for giving the delay characteristic thereto, the estimation delay of the estimated speed ω0 appears as a delay of the acceleration relative to rising of the output torque τ, and error occurs in the moment of inertia calculated as (transitional torque component)/(transitional acceleration component). In addition, the faster the rising of the actual speed ω of the AC rotating machine 1 is, the greater the estimation delay of the estimated speed ω0 is, and thus the error in the moment of inertia increases.

In this case, the moment of inertia is represented as follows.

$$F\tau(s) \cdot \tau / (s \cdot F\tau(s) \cdot Gx(s) \cdot \omega) = \tau / (s \cdot Gx(s) \cdot \omega)$$

That is, the delay characteristic is left in the denominator component, and thus it is found that the moment of inertia cannot be calculated accurately.

If a moment of inertia Jm of the AC rotating machine 1 identified in advance is used as the moment of inertia used in the command generation unit 4, the gain kwp used for calculation of the current command iq* shown by the above expression (1) is represented as follows.

$$kwp = \omega sc \cdot Pm^2 \cdot \phi f / Jm$$

The speed response set value ωsc in this case is Jm/(Jm+Ja) times the value in the case of using the original moment of inertia J obtained by adding the moment of inertia Jm of the AC rotating machine 1 and the moment of inertia Ja of the mechanical device 2, and thus decreases. Therefore, a desired speed response cannot be obtained.

As described above, in the present embodiment, the output torque τ is corrected using the transfer characteristic (transfer function Gx(s)) corresponding to the estimation delay of the estimated speed ω0, thereby calculating the corrected output torque τc having the delay characteristic corresponding to the estimation delay. Then, the moment of inertia J is calculated from the estimated speed ω0 and the corrected output torque ωc having the delay characteristic equivalent to the estimation delay of the estimated speed ω0. Therefore, the moment of inertia J can be calculated accurately. Then, the command generation unit 4 generates the voltage commands vd* and vq*, using the accurately calculated moment of inertia J. Therefore, the AC rotating machine 1 can be reliably controlled with a desired response.

Depending on the configuration of the mechanical device 2, it is assumed that the moment of inertia J varies during operation of the AC rotating machine 1, but it is possible to continuously calculate the moment of inertia J while continuing extraction of the transitional torque component 81a and the transitional acceleration component 82a during the operation.

Since the closed loop transfer function Gx(s) synchronized with the estimation delay of the estimated speed ω0 is used as the transfer characteristic for correcting the output torque τ, the corrected output torque τc having the delay characteristic equivalent to the estimation delay of the estimated speed ω0 can be calculated accurately, whereby the estimated speed ω0 and the corrected output torque τc can be synchronized with each other.

The transfer function Gx(s) indicating the transfer characteristic for correcting the output torque τ is not limited to the one shown by the above expression (3), but may be the one that corresponds to the estimation delay occurring due to calculation of the estimated speed ω0.

In the above embodiment, the inertia moment computing unit 8 calculates the moment of inertia J by dividing the transitional torque component 81a directly by the transitional acceleration component 82a. However, without limitation thereto, it is possible to calculate the moment of inertia accurately by using a statistical method as shown in Non-Patent Document 1, for example.

In the above embodiment, a synchronous machine using a permanent magnet is used as the AC rotating machine 1. However, another AC rotating machine 1 such as an induction machine may be applied.

The voltage application unit 5 may be provided outside the control device 10. In this case, the control device 10 outputs the voltage commands vd* and vq* to the voltage application unit 5.

In the speed estimation unit 6, the estimated speed ω0 is integrated by the integrator 62, to calculate the estimated magnetic pole position θ0. However, without limitation thereto, for example, as described in Document: "Position and speed Sensorless Controls of Cylindrical Brushless DC Motors Using Disturbance Observers and Adaptive speed Estimators", IEEJ transactions D, vol. 118, no. 7/8, 1998, using estimated induced voltage in a stator coordinate system (αβ axes) of the DC motor, the estimated magnetic pole position may be calculated from the arctangent of the estimated induced voltage.

Figure 4:
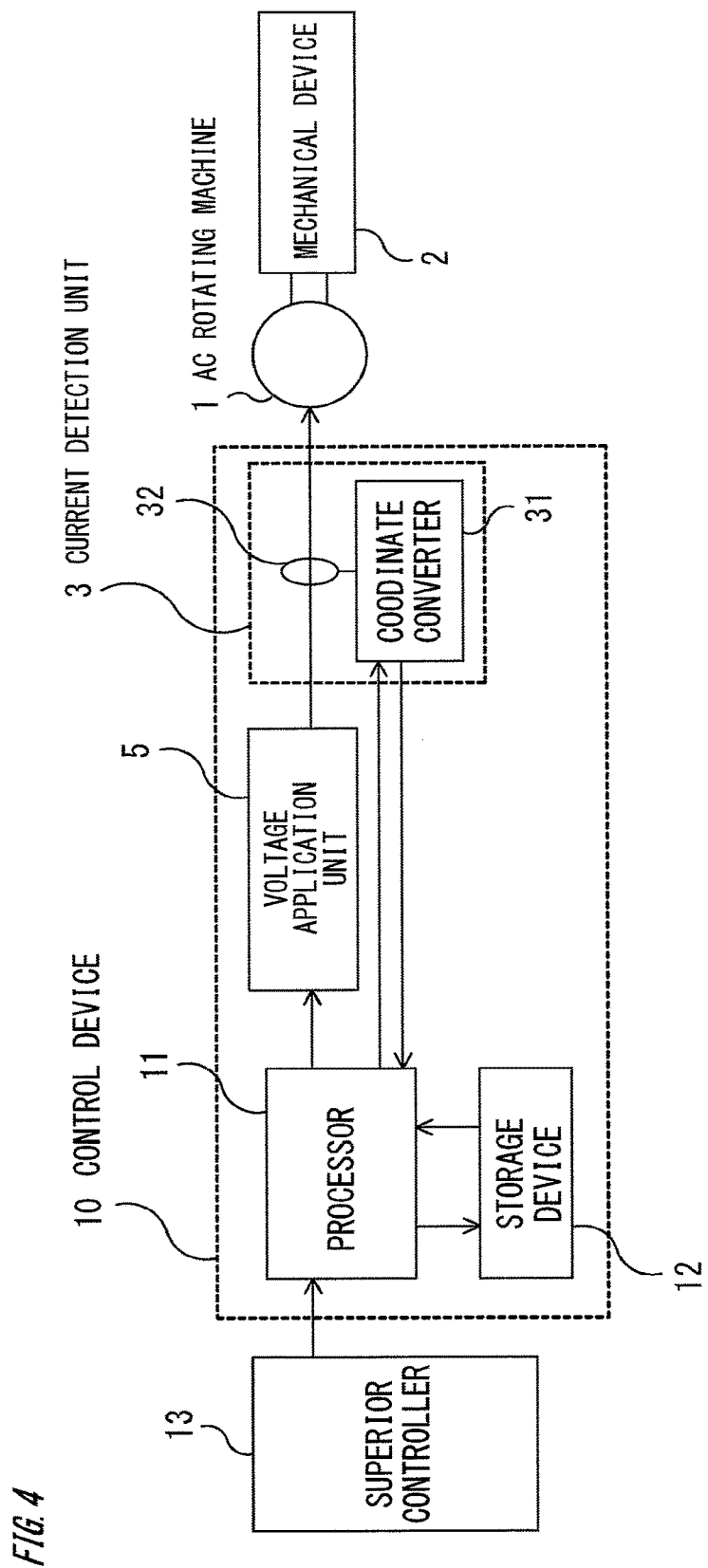
FIG. 4 is a block diagram showing the hardware configuration of a rotating machine system including the control device for AC rotating machine in embodiment 1 of the present invention.

Next, FIG. 4 shows the hardware configuration of a rotating machine system including the control device 10 for the AC rotating machine 1 according to the above embodiment 1.

As shown in FIG. 4, the rotating machine system includes the AC rotating machine 1, the control device 10 for the AC rotating machine 1, and a superior controller 13 for giving a command to the control device 10, and drives the mechanical device 2 connected to the AC rotating machine 1. The control device 10 includes, as a hardware configuration, a processor 11, a storage device 12, the voltage application unit 5, and the current detection unit 3.

The command generation unit 4, the speed estimation unit 6, the output torque computing unit 7, and the inertia moment computing unit 8 shown in FIG. 1 are realized by the processor 11 which executes a program stored in the storage device 12.

The storage device 12 is provided with a volatile storage device such as a random access memory, and a nonvolatile auxiliary storage device such as a flash memory, though not shown. Instead of a nonvolatile auxiliary storage device, an auxiliary storage device such as a hard disk may be provided.

A program is inputted to the processor 11 via the volatile storage device from the auxiliary storage device of the storage device 12, and the processor 11 executes the program inputted from the storage device 12. The processor 11 outputs data such as a calculation result to the volatile storage device of the storage device 12, or to the auxiliary storage device via the volatile storage device, thereby storing the data.

The command generation unit 4, the speed estimation unit 6, the output torque computing unit 7, and the inertia moment computing unit 8 may be realized by a processing circuit such as a system LSI. The coordinate converter 31 in the current detection unit 3, and the function of converting the voltage commands vd* and vq* inputted to the voltage application unit 5 to the three-phase voltage commands, may be realized by the processor 11 or a processing circuit such as a system LSI. The above functions may be executed by cooperation of a plurality of processors 11 and a plurality of storage devices 12, or may be executed by cooperation of a plurality of processing circuits. The above functions may be executed by combination of those.

Embodiment 2

Next, a control device for AC rotating machine according to embodiment 2 of the present invention will be described.

The inertia moment computing unit 8 derives the moment of inertia J using calculation of (transitional torque component 81a)/(transitional acceleration component 82a), as in the above embodiment 1. At this time, if the values of the transitional torque component 81a and the transitional acceleration component 82a are small, the S/N ratio (the ratio of the signal level to the noise level) is deteriorated and thus the moment of inertia J cannot be calculated accurately. Therefore, in order to ensure the S/N ratio, threshold values are set for the transitional torque component 81a and the transitional acceleration component 82a, and when at least one of the transitional torque component 81a and the transitional acceleration component 82a is equal to or smaller than the set threshold value, a constant value is outputted as the moment of inertia J.

The other configuration is the same as in the above embodiment 1.

Figure 5:
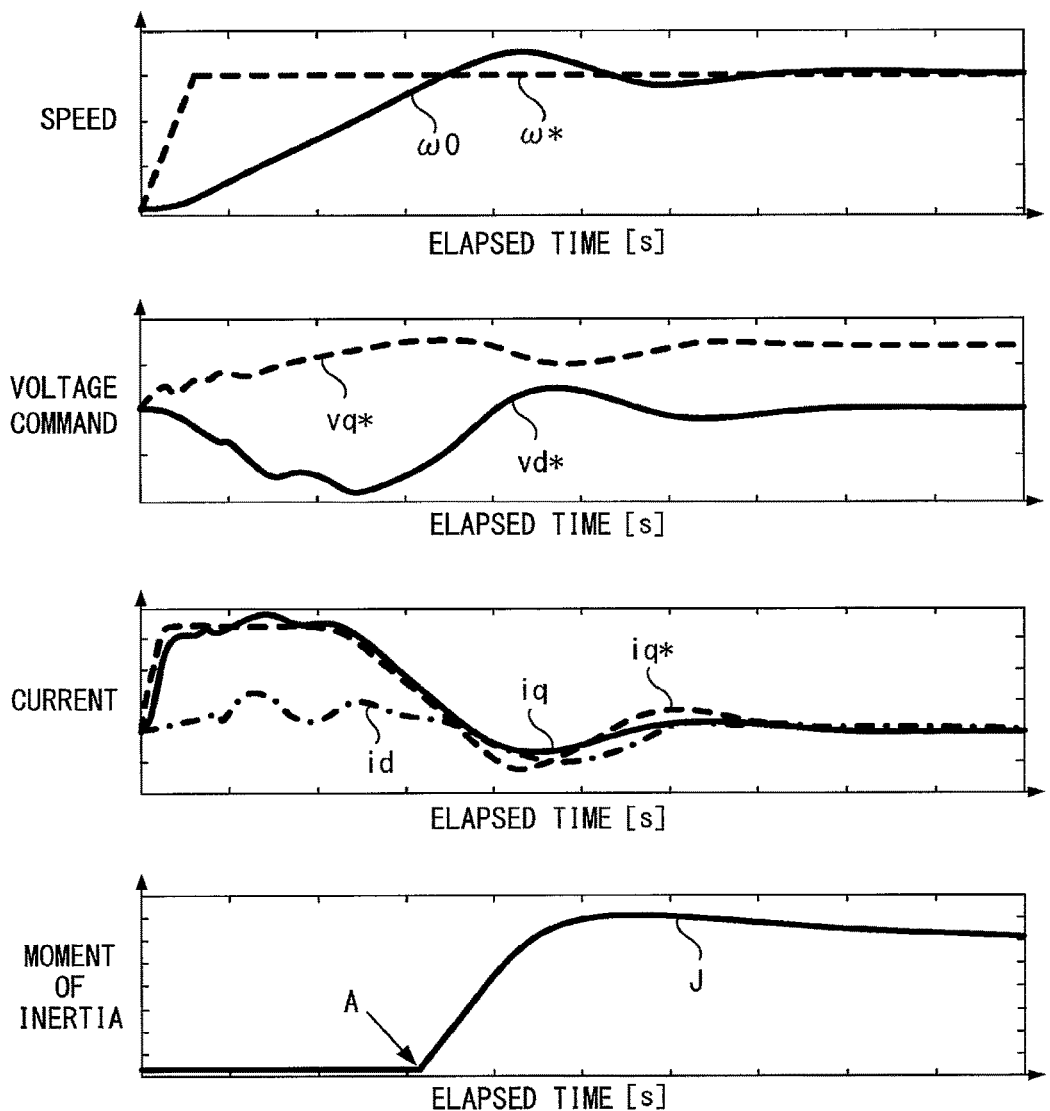
FIG. 5 is a waveform diagram of several sections for explaining operation in a control device for AC rotating machine according to embodiment 2 of the present invention.

FIG. 5 is a waveform diagram of several sections illustrating operation of the control device 10 of the AC rotating machine 1 according to embodiment 2 of the present invention.

As shown in FIG. 5, the speed command ω* given to the control device 10 rises, and then as the time elapses, the estimated speed ω0 approaches the speed command ω*, and the voltage commands vd* and vq* and the current command iq* are stabilized, so that the detected current iq approaches the current command iq*.

In the waveform diagram indicating the moment of inertia J, in the region rightward of point A in the drawing, the transitional torque component 81a and the transitional acceleration component 82a (not shown) are both equal to or greater than the threshold values. The moment of inertia J has a constant value until point A, and thereafter, has a value obtained by calculation of (transitional torque component 81a)/(transitional acceleration component 82a).

In the present embodiment 2, the same effect as in the above embodiment 1 is obtained, and in addition, the inertia moment computing unit 8 is provided with threshold values for the transitional torque component 81a and the transitional acceleration component 82a, to stop low-reliability calculation, whereby deterioration in the accuracy of calculation of the moment of inertia can be prevented. In addition, during the period in which the calculation is stopped, a constant value is used as the moment of inertia, whereby the control device 10 can continuously operate the AC rotating machine 1.

Also in the case where the moment of inertia varies during operation, extraction of the transitional torque component 81a and the transitional acceleration component 82a is continued and calculation is performed together with determination as to whether or not calculation of the moment of inertia can be performed, whereby high calculation accuracy can be maintained.

Embodiment 3

Next, a control device for AC rotating machine according to embodiment 3 of the present invention will be described.

Figure 6:
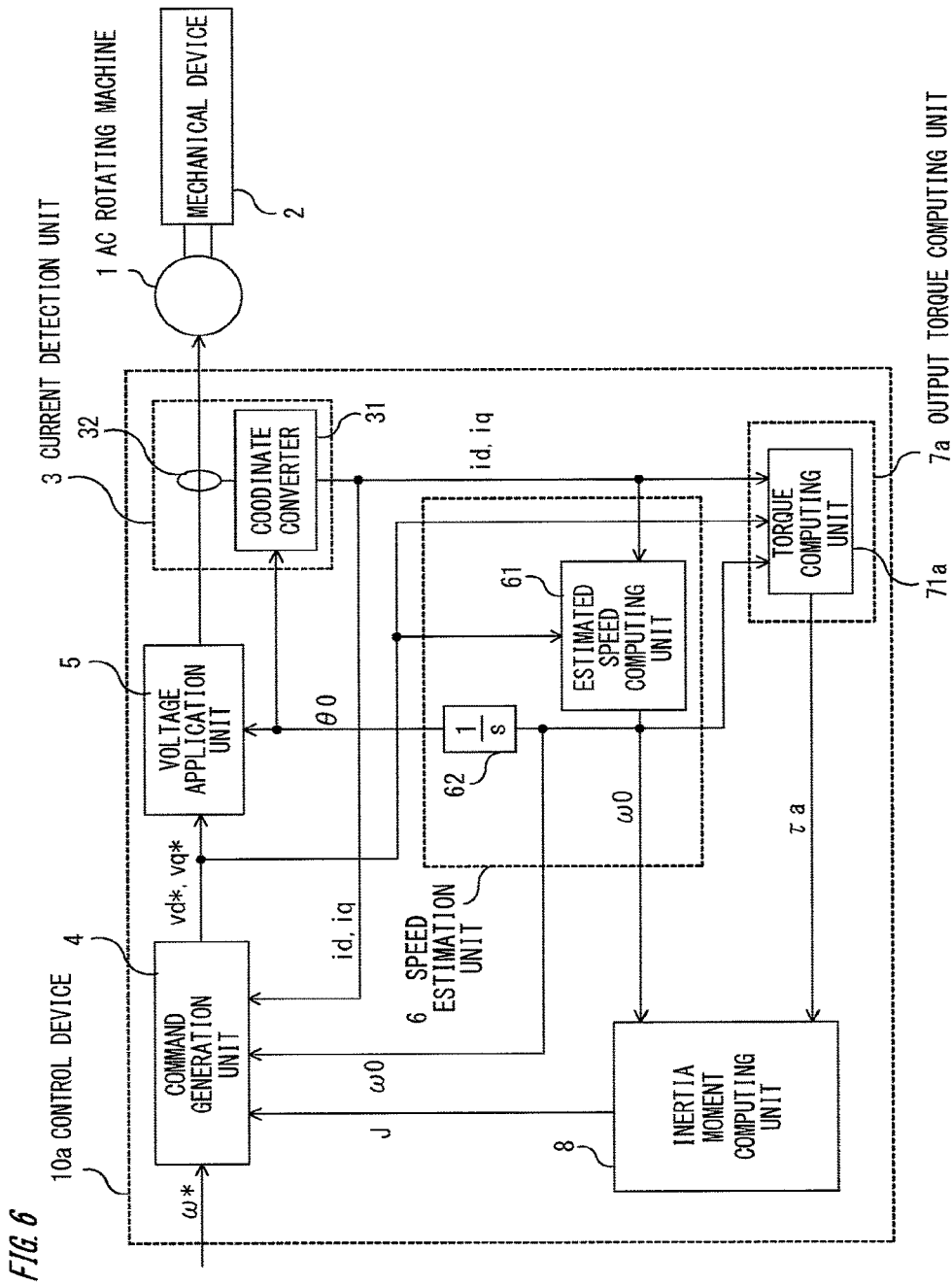
FIG. 6 is a block diagram showing the configuration of a control device for AC rotating machine according to embodiment 3 of the present invention.

FIG. 6 is a block diagram showing the configuration of a control device 10a for an AC rotating machine 1 according to embodiment 3 of the present invention.

As shown in FIG. 6, the control device 10a includes the current detection unit 3, the command generation unit 4, the voltage application unit 5, the speed estimation unit 6, an output torque computing unit 7a, and the inertia moment computing unit 8. The output torque computing unit 7a includes a torque computing unit 71a for calculating output torque τa. The torque computing unit 71a calculates the output torque τa on the basis of the detected currents id and iq from the current detection unit 3, the voltage commands vd* and vq* from the command generation unit 4, and the estimated speed ω0 from the speed estimation unit 6. The configuration other than the output torque computing unit 7a is the same as in the above embodiment 1.

Figure 7:
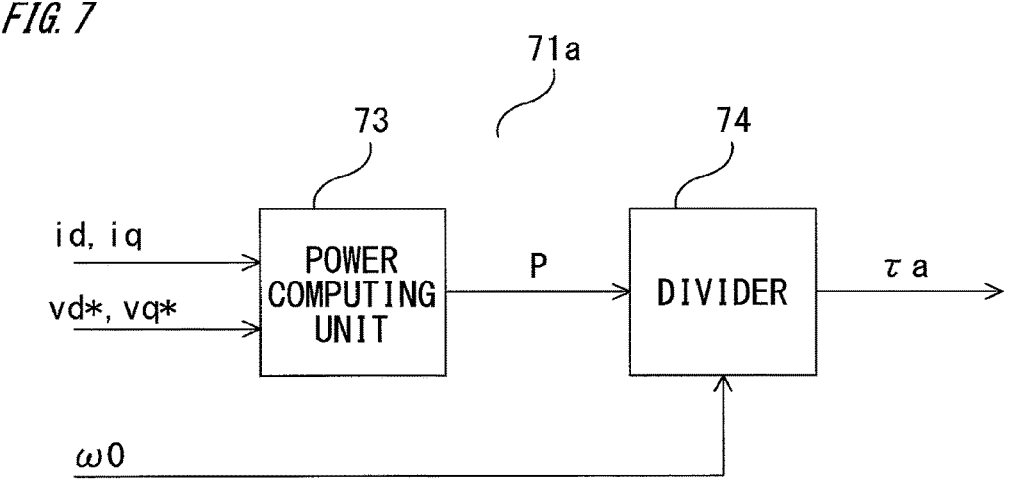
FIG. 7 is a block diagram illustrating an output torque computing unit in embodiment 3 of the present invention.

FIG. 7 is a diagram illustrating the configuration of the torque computing unit 71a.

As shown in FIG. 7, the torque computing unit 71a includes: a power computing unit 73 for calculating power P outputted from the AC rotating machine 1, on the basis of the detected currents id and iq and the voltage commands vd* and vq*; and a divider 74 for calculating the output torque τa by dividing the power P from the power computing unit 73 by the estimated speed ω0.

The power computing unit 73 calculates the power P by the following expression (16), using an inner product of voltage (voltage commands vd* and vq*) and current (detected currents id and iq).

$$P = vd^* \cdot id + vq^* \cdot iq \quad (16)$$

Then, the divider 74 calculates the output torque τa by the following expression (17).

$$\tau a = P/\omega 0 \quad (17)$$

In the divider 74 for dividing the power P by the estimated speed ω0, a lower limit value for preventing division by zero is set, and when the magnitude of the estimated speed ω0 is smaller than the set lower limit value, the division indicated by the above expression (17) is stopped. In this case, the output torque τa is calculated on the basis of the detected currents id and iq by the above expression (4) used for calculation of the output torque in the above embodiment 1.

In this case, as in the above embodiment 1, the estimated magnetic pole position θ0 outputted from the speed estimation unit 6 is used both for conversion of the voltage commands vd* and vq* to three-phase voltage commands in a coordinate system at rest (three-phase coordinate system) and for coordinate conversion by the coordinate converter 31 to obtain the detected currents id and iq. Therefore, even in the case where the estimated magnetic pole position θ0 has error due to the estimation delay relative to the actual magnetic pole position, the phase difference between the voltage and the current does not change and thus the value of the inner product does not change. That is, the power computing unit 73 can accurately calculate the power P without being influenced by the error of the estimated magnetic pole position θ0.

In general, the output torque of the rotating machine can be calculated by dividing the output power by the speed. The divider 74 calculates the output torque τa by dividing the power P by the estimated speed ω0. At this time, by dividing the accurately calculated power P by the estimated speed ω0, the delay characteristic corresponding to the estimation delay of the estimated speed ω0 can be given to the calculated output torque τa.

Then, the inertia moment computing unit 8 receives the estimated speed ω0 from the speed estimation unit 6 and the output torque τa from the output torque computing unit 7a, and calculates the moment of inertia J in the same manner as in the above embodiment 1.

In the present embodiment, since the output torque computing unit 7a gives the delay characteristic corresponding to the estimation delay of the estimated speed ω0 to the output torque τa when calculating the output torque tea, the output torque τa and the estimation delay of the estimated speed ω0 have equivalent delay characteristics. Thus, as in the above embodiment 1, the moment of inertia J can be calculated accurately, and the same effect as in the above embodiment 1 is obtained.

In addition, it is possible to accurately calculate the output torque τa having the delay characteristic by dividing, by the estimated speed ω0, the power P accurately calculated from the detected currents id and iq and the voltage commands vd* and vq* for which the same estimated magnetic pole position θ0 is used in their coordinate conversions.

Further, since a lower limit value is set for the divider 74 to switch calculation of the output torque τa, even if the estimated speed ω0 becomes zero depending on the operation state of the AC rotating machine 1, the output torque τa can be continuously calculated, whereby the control device 10a can continuously operate the AC rotating machine 1.

Although the output torque can be calculated by dividing the output power by the speed, an alternative for the estimated speed ω0 may be used as the speed. For example, the angular frequency of the voltage applied to the AC rotating machine 1 may be regarded as the speed for the output power P, and it is also possible to calculate the output torque τa by using, in the divider 74, the angular frequency as shown in the above Non-Patent Document 2.

Embodiment 4

Next, a control device for AC rotating machine according to embodiment 4 of the present invention will be described on the basis of FIG. 8.

Figure 8:
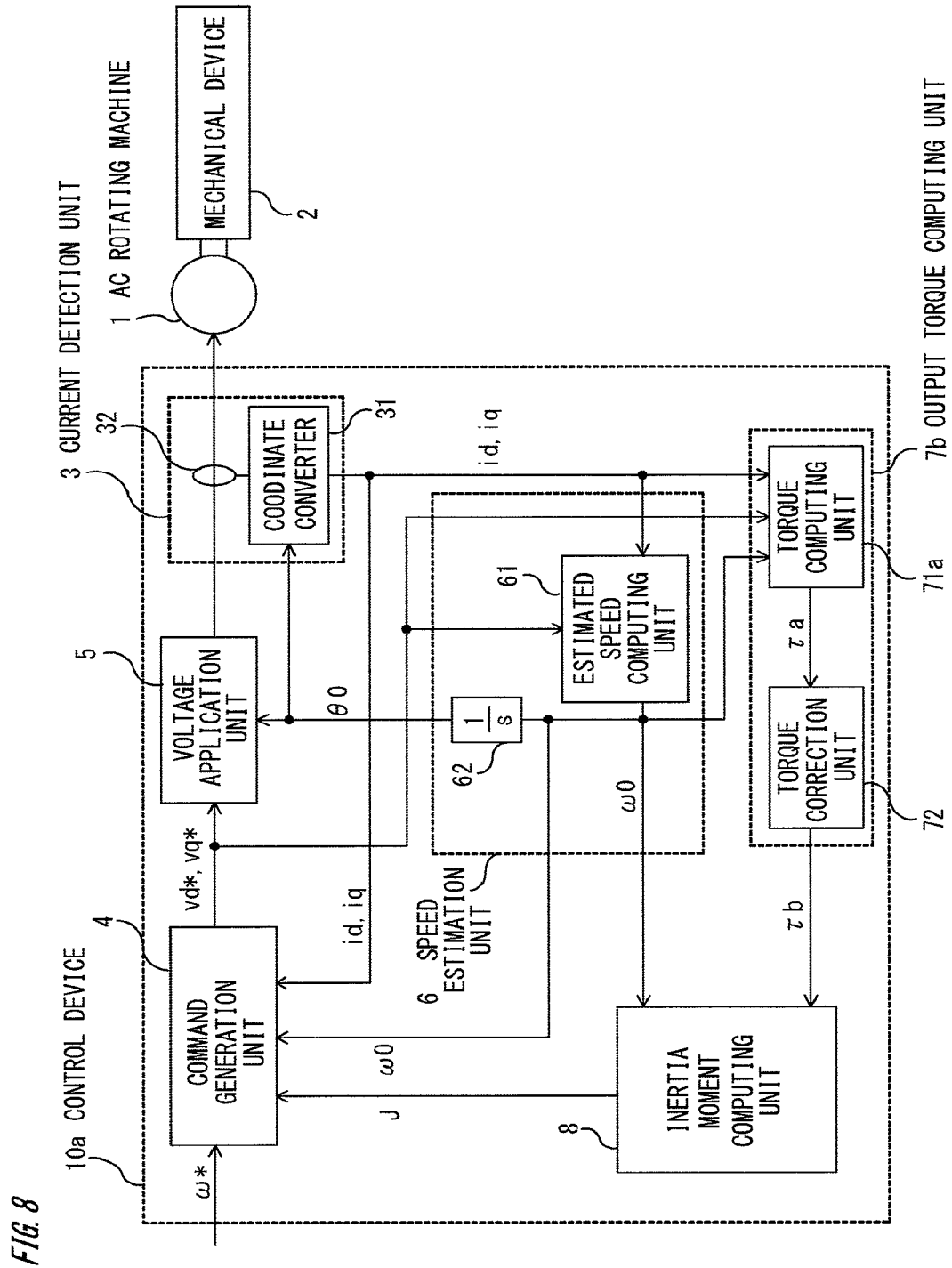
FIG. 8 is a block diagram showing the configuration of a control device for AC rotating machine according to embodiment 4 of the present invention.

In the present embodiment 4, as shown in FIG. 8, an output torque computing unit 7b includes the torque computing unit 71a and the torque correction unit 72, and the torque correction unit 72 corrects the output torque ta calculated by the torque computing unit 71a and outputs corrected output torque τb. The other configuration is the same as in the above embodiment 3.

The torque computing unit 71a has the same configuration as in the above embodiment 3, and calculates power P from the detected currents id and iq and the voltage commands vd* and vq* and divides the power P by the estimated speed ω0, thereby calculating the output torque τa having a delay characteristic.

The torque correction unit 72 has the same configuration as in the above embodiment 1, and causes the output torque τa calculated by the torque computing unit 71a to pass through a filter, thereby outputting the corrected output torque τb. The filter of the torque correction unit 72 is a filter having the same transfer characteristic as the transfer characteristic from the actual speed ω to the estimated speed ω0.

As described above, in the present embodiment, the output torque computing unit 7b gives the delay characteristic corresponding to the estimation delay of the estimated speed ω0, to the output torque τa, and further corrects the output torque τa, whereby it becomes possible to further accurately bring the delay characteristic of the corrected output torque rip close to the delay characteristic corresponding to the estimation delay of the estimated speed ω0. Thus, the same effect as in the above embodiment 3 is obtained, and in addition, the moment of inertia J can be calculated further accurately.

It is noted that, within the scope of the present invention, the above embodiments may be freely combined with each other, or each of the above embodiments may be modified or simplified as appropriate.

The invention claimed is:

1. A control device for AC rotating machine, comprising:
a command generator for, using a moment of inertia, generating a voltage command for driving an AC rotating machine connected to a mechanical device;
a current detector for detecting current of the AC rotating machine;
an output torque calculator for calculating an output torque of the AC rotating machine on the basis of the detected current from the current detector;
a speed estimator for calculating an estimated speed of the AC rotating machine on the basis of the voltage command and the detected current, the estimated speed having an estimation delay from the actual speed of the AC rotating machine, the estimation delay being produced in calculating the estimated speed by the speed estimator; and
an inertia moment calculator for calculating the moment of inertia on the basis of the estimated speed and the output torque, wherein
the output torque calculator calculates the output torque to have a delay characteristic corresponding to the estimation delay of the estimated speed, and
the inertia moment calculator calculates the moment of inertia, using the output torque having the delay characteristic.

2. The control device for AC rotating machine according to claim 1, wherein
the output torque calculator gives the delay characteristic to the output torque, by calculating the output torque on the basis of: output power obtained from the detected current and the voltage command; and the estimated speed.

3. The control device for AC rotating machine according to claim 1, wherein
the output torque calculator includes a torque correction calculator for correcting the output torque calculated on the basis of the detected current, and
the torque correction calculator corrects the output torque, using a transfer characteristic corresponding to the estimation delay of the estimated speed, thereby giving the delay characteristic to the output torque.

4. The control device for AC rotating machine according to claim 2, wherein
the output torque calculator includes a torque correction calculator for correcting the calculated output torque, and
the torque correction calculator corrects the output torque, using a transfer characteristic corresponding to the estimation delay of the estimated speed.

5. The control device for AC rotating machine according to claim 3, wherein
the transfer characteristic is a closed loop transfer function synchronized with the estimation delay of the estimated speed.

6. The control device for AC rotating machine according to claim 2, wherein
the output torque calculator calculates the output torque by dividing the output power by the estimated speed, and when a magnitude of the estimated speed is smaller than a set lower limit value, calculates the output torque on the basis of the detected current without using the output power and the estimated speed.

7. The control device for AC rotating machine according to claim 1, wherein
an estimated magnetic pole position of the AC rotating machine calculated on the basis of the estimated speed is used in coordinate conversion between a rotational two-axis coordinate system and a three-phase coordinate system, for both the detected current and the voltage command.

8. The control device for AC rotating machine according to claim 1, wherein
the inertia moment calculator extracts a transitional acceleration component from the estimated speed, extracts a transitional torque component from the output torque having the delay characteristic, and calculates the moment of inertia from the transitional acceleration component and the transitional torque component,
threshold values are respectively set for the transitional acceleration component and the transitional torque component, and
when at least one of the transitional acceleration component and the transitional torque component is equal to or smaller than the corresponding threshold value, the inertia moment calculator outputs a constant value as the moment of inertia.

9. The control device for AC rotating machine according to claim 1, wherein
the current detector includes a coordinate converter for converting current of the AC rotating machine to current in a rotational two-axis coordinate system, and detects the detected current as current in the rotational two-axis coordinate system, and
the command generator includes: a speed controller for generating a current command so that the estimated speed follows a speed command; and a current controller for generating the voltage command so that the detected current follows the current command.

10. The control device for AC rotating machine according to claim 1, further comprising a power converter that applies a voltage to the AC rotating machine on the basis of the voltage command.

11. The control device for AC rotating machine according to claim 4, wherein
the transfer characteristic is a closed loop transfer function synchronized with the estimation delay of the estimated speed.

12. The control device for AC rotating machine according to claim 4, wherein
the output torque calculator calculates the output torque by dividing the output power by the estimated speed, and when a magnitude of the estimated speed is smaller than a set lower limit value, calculates the output torque on the basis of the detected current without using the output power and the estimated speed.

13. The control device for AC rotating machine according to claim 2, wherein
an estimated magnetic pole position of the AC rotating machine calculated on the basis of the estimated speed is used in coordinate conversion between a rotational two-axis coordinate system and a three-phase coordinate system, for both the detected current and the voltage command.

14. The control device for AC rotating machine according to claim 2, wherein
the inertia moment calculator extracts a transitional acceleration component from the estimated speed, extracts a transitional torque component from the output torque having the delay characteristic, and calculates the moment of inertia from the transitional acceleration component and the transitional torque component, threshold values are respectively set for the transitional acceleration component and the transitional torque component, and when at least one of the transitional acceleration component and the transitional torque component is equal to or smaller than the corresponding threshold value, the inertia moment calculator outputs a constant value as the moment of inertia.

15. The control device for AC rotating machine according to claim 2, wherein the current detector includes a coordinate converter for converting current of the AC rotating machine to current in a rotational two-axis coordinate system, and detects the detected current as current in the rotational two-axis coordinate system, and the command generator includes: a speed controller for generating a current command so that the estimated speed follows a speed command; and a current controller for generating the voltage command so that the detected current follows the current command.

16. The control device for AC rotating machine according to claim 2, further comprising a power converter that applies a voltage to the AC rotating machine on the basis of the voltage command.

17. The control device for AC rotating machine according to claim 3, wherein an estimated magnetic pole position of the AC rotating machine calculated on the basis of the estimated speed is used in coordinate conversion between a rotational two-axis coordinate system and a three-phase coordinate system, for both the detected current and the voltage command.

18. The control device for AC rotating machine according to claim 3, wherein the inertia moment calculator extracts a transitional acceleration component from the estimated speed, extracts a transitional torque component from the output torque having the delay characteristic, and calculates the moment of inertia from the transitional acceleration component and the transitional torque component, threshold values are respectively set for the transitional acceleration component and the transitional torque component, and when at least one of the transitional acceleration component and the transitional torque component is equal to or smaller than the corresponding threshold value, the inertia moment calculator outputs a constant value as the moment of inertia.

19. The control device for AC rotating machine according to claim 3, wherein the current detector includes a coordinate converter for converting current of the AC rotating machine to current in a rotational two-axis coordinate system, and detects the detected current as current in the rotational two-axis coordinate system, and the command generator includes: a speed controller for generating a current command so that the estimated speed follows a speed command; and a current controller for generating the voltage command so that the detected current follows the current command.

20. The control device for AC rotating machine according to claim 3, further comprising a power converter that applies a voltage to the AC rotating machine on the basis of the voltage command.

* * * * *